(12) United States Patent
Choung (10) Patent No.: US 10,787,762 B2
(45) Date of Patent: Sep. 29, 2020

(54) HOME APPLIANCE AND METHOD FOR CONTROLLING THE SAME

(71) Applicant: LG ELECTRONICS INC., Seoul (KR)

(72) Inventor: Dongsoo Choung, Seongnam-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/543,413

(22) Filed: Aug. 16, 2019

(65) Prior Publication Data
US 2019/0368103 A1 Dec. 5, 2019

(30) Foreign Application Priority Data

Jul. 19, 2019 (KR) .................. 10-2019-0087595

(51) Int. Cl.
| | | |
|---|---|---|
| *H04R 3/02* | (2006.01) | |
| *D06F 37/20* | (2006.01) | |
| *D06F 33/00* | (2020.01) | |
| *D06F 34/28* | (2020.01) | |
| *D06F 58/30* | (2020.01) | |

(52) U.S. Cl.
CPC ............ *D06F 37/203* (2013.01); *D06F 33/00* (2013.01); *D06F 34/28* (2020.02); *D06F 58/30* (2020.02); *G05B 2219/2642* (2013.01)

(58) Field of Classification Search
CPC ........ D06F 37/203; D06F 58/30; D06F 34/28; D06F 33/00; G05B 2219/2642
See application file for complete search history.

(56) References Cited

U.S. PATENT DOCUMENTS

| | | | |
|---|---|---|---|
| 6,137,886 A * | 10/2000 | Shoureshi ............. | F16F 15/002 |
| | | | 381/71.2 |
| 2004/0122614 A1* | 6/2004 | Youn ..................... | G10K 11/178 |
| | | | 702/127 |
| 2016/0316293 A1* | 10/2016 | Klimanis ............. | G10L 21/0208 |
| 2019/0090056 A1* | 3/2019 | Rexach .................. | G06F 3/017 |
| 2019/0200872 A1* | 7/2019 | Matsuoka ................ | H04N 5/33 |

FOREIGN PATENT DOCUMENTS

| | | |
|---|---|---|
| KR | 1019950006085 | 3/1995 |
| KR | 101466336 | 11/2014 |

* cited by examiner

*Primary Examiner* — Munear T Akki
(74) *Attorney, Agent, or Firm* — Lee, Hong, Degerman, Kang & Waimey (57) ABSTRACT

A method for controlling a home appliance in consideration of a state of a surrounding environment is disclosed. A method for controlling a home appliance according to an exemplary embodiment of the present disclosure includes operating a home appliance using a first operation profile, identifying at least one of a behavior type of a user or a type of sound around the user, using Internet of Things (IoT) communication using 5G communication and artificial intelligence (AI), and changing an operation profile for operating a home appliance to a second operation profile, based on at least one of the identified behavior type of the user or type of sound around the user. According to the present disclosure, in accordance with the state of the surrounding environment, the operation noise can be reduced or the operation time of the home appliance can reduced without increasing the discomfort of the user, and therefore the discomfort of the user due to the operation noise can be relieved.

4 Claims, 7 Drawing Sheets

HOME APPLIANCE AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Patent Application No. 10-2019-0087595, filed on Jul. 19, 2019, the contents of which are all hereby incorporated by reference herein in its entirety.

BACKGROUND

1. Technical Field

The present disclosure relates to a home appliance, and more particularly, to a home appliance capable of a level of an operation noise in accordance with a state of a surrounding environment and a method for controlling the same.

2. Description of the Related Art

Home appliances which operate using power from a motor or the like generally generate uncomfortable noises during the operation. For example, the washing machine performs a washing operation or a spin-drying operation by rotating a motor. However, the rotation of the motor causes vibration of a floor or a wall, which is converted into noises to be propagated to the user. Consumer's demand to reduce uncomfortable noises caused by the home appliances such as a washing machine has increased to keep a pleasant living environment.

Patent Document 1 (Korean Unexamined Patent Application Publication No. 10-1995-0006085) discloses a washing machine having a noise adjusting device which senses a noise around the washing machine and adjusts a revolution per minute (RPM) of a motor so as to generate an optimal operation noise in accordance with a level of a surrounding noise sensed by the washing machine. Patent Document 2 (Korean Registered Patent Publication No. 10-146636) discloses a washing machine which senses a pattern of a noise generated during the operation and outputs sound to cancel the sensed noise.

In both Patent Documents 1 and 2, a noise adjusting action is performed based on a noise sensed by the washing machine. However, the noise sensed by the washing machine may be different from a noise which is sensed by the user. In Patent Document 1, reducing the operation noise of the washing machine without considering the noise sensed by the user may unnecessarily increase an operation time of the washing machine, or reduce washing performance.

In Patent Document 2, a sound for cancelling the noise sensed by the washing machine may not effectively cancel the noise sensed by the user and may rather increase the noise sensed by the user.

SUMMARY OF THE INVENTION

An object to be achieved by the present disclosure is to reduce an operation noise which causes discomfort to the user by identifying a state in which the user may be sensitive to the operation noise of the home appliance.

Another object to be achieved by the present disclosure is to shorten an operation time of the home appliance without substantially increasing the discomfort of the user due to the operation noise, by identifying a state in which the user may be insensitive to the operation noise of the home appliance.

Another object to be achieved by the present disclosure is to compromise the conflicting demands of the users, such as reduction in the operation noise of the home appliance and reduction in the operation time of the home appliance, according to the state of the surrounding environment.

The object of the present disclosure is not limited to the above-mentioned objects and other objects and advantages of the present disclosure which have not been mentioned above may be understood by the following description and become more apparent from exemplary embodiments of the present disclosure. Further, it is understood that the objects and advantages of the present disclosure may be embodied by the means and a combination thereof in the claims.

According to a first aspect of the present disclosure, a method for controlling a home appliance comprises: identifying a state of a surrounding environment and setting an operation profile for operating the home appliance, based on the identified state of the surrounding environment.

According to an exemplary embodiment, the operation profile may be set to have a reduced operation time and an increased average noise level or set to have an increased operation time and a reduced average noise level, based on the state of the surrounding environment.

According to another exemplary embodiment, identifying a state of a surrounding environment may comprise identifying at least one of a behavior type of the user or a type of sound around the user.

According to another exemplary embodiment, the state of the surrounding environment may be identified based on information from one or more devices in a home network connected to the home appliance and the type of sound around the user may be identified by providing sound information from the one or more devices to a deep neural network which has been trained in advance.

According to a second aspect of the present disclosure, a method for controlling a home appliance comprises: identifying an operation noise which is caused by an operation of the home appliance; identifying a position of a user; and setting an operation profile for operating the home appliance, based on the position of the user and the operation noise.

According to an exemplary embodiment, the position of the user may be identified based on information from one or more devices in a home network connected to the home appliance, and the operation noise which is caused by an operation of the home appliance may be identified based on at least one of an operation profile which operates the home appliance or a sensor signal from an acoustic sensor equipped in the home appliance.

According to another exemplary embodiment, the operation profile may be changed when a sensible noise of the user exceeds a threshold noise level and the sensible noise of the user may be estimated based on the position of the user and the operation noise. Further, the threshold noise level may be determined based on at least one of the behavior type of the user or a type of the surrounding sound of the user.

According to a third aspect of the present disclosure, a home appliance comprises: a driving unit for supplying power to perform an operation in accordance with an operation profile; a network interface for receiving information from one or more devices in a home network; and a processor for setting an operation profile based on information from the home device.

According to an exemplary embodiment, the processor may estimate a sensible noise of a user in accordance with a position of the user and an operation profile to be set and set the operation profile based on the estimated sensible noise.

According to another exemplary embodiment, when the estimated sensible noise exceeds a threshold noise level, the processor may change the operation profile to increase the operation time of the operation profile. In this case, the threshold noise level may be determined based on at least one of a type of the surrounding sound of the user or the behavior type of the user.

According to the present disclosure, it is possible to reduce the operation noise only when it causes the discomfort to the user, by taking a behavior type of the user, a type of sound around the user, or a sensible noise of the user in consideration when setting an operation profile. Further, when the operation noise does not cause the discomfort to the user, the operation time can be reduced. Accordingly, the conflicting demands of the user of reduction in the operation noise and reduction of the operation time can be effectively compromised.

Further, according to the present disclosure, a home network such as home IoT and an artificial intelligence technique are used to more accurately estimate the state of the surrounding environment of the user. Therefore, the home appliances can operate to be more comfortable to the user.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Advantages and characteristics of the present invention and a method of achieving the advantages and characteristics will be clear by referring to exemplary embodiments described below in detail together with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In describing the present invention, when it is determined that a detailed description of related well-known technology may obscure the gist of the present invention, the detailed description thereof will be omitted.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, the terms such as "first," "second," and other numerical terms may be used herein only to describe various elements, but these elements should not be limited by these terms. Furthermore, these terms such as "first," "second," and other numerical terms, are used only to distinguish one element from another element.

Hereinbelow, the example embodiments of the present disclosure will be described in greater detail with reference to the accompanying drawings, and on all these accompanying drawings, the identical or analogous elements are designated by the same reference numeral, and repeated description of the common elements will be omitted.

Figure 1:
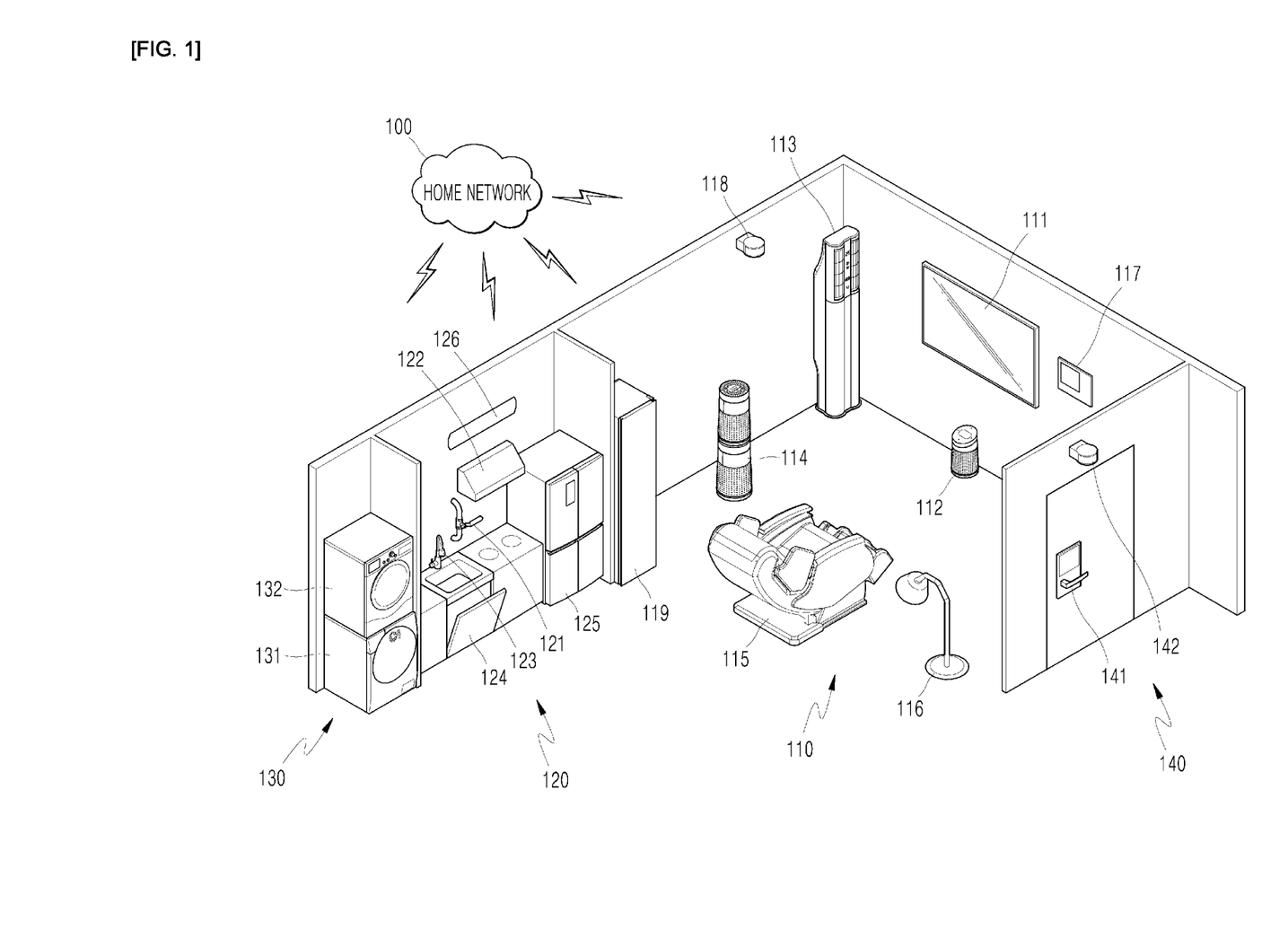
FIG. 1 is an exemplary diagram of a surrounding environment in which a home appliance according to an exemplary embodiment of the present disclosure which generates an operation noise is disposed.

FIG. 1 is an exemplary diagram of a surrounding environment in which a home appliance which generates an operation noise is disposed according to an exemplary embodiment of the present disclosure.

Referring to FIG. 1, a surrounding environment may be a living area (for example, a home area) including a plurality of partitioned spaces where the user may be located, for example, a living room 110, a kitchen 120, a laundry room 130, and a porch area 140. For example, in the living room 110, a TV 111, an artificial intelligence (AI) speaker 112, an air conditioner 113, an air purifier 114, a massage chair 115, a living room light 116, a home control and automation system 117, a human body sensing sensor 118, and a closet-type clothing care system 119 may be disposed. In the kitchen 120, a gas valve 121 for a gas stove, a smoke detector 122 of a hood, a water valve 123 of a sink, a dish washer 124, a refrigerator 125, and a kitchen light 126 may be disposed. In the laundry room 130, a washing machine 131 and a drying machine 132 may be disposed. In the porch area 140, a front door with a door lock 141 and an entrance sensor 142 may be disposed. The washing machine 131, the drying machine 132, the dish washer 124, or the closet-type clothing care system 119 may be home appliances which cause an operation noise according to an exemplary embodiment of the present disclosure.

The above-described devices 111 to 119, 121 to 125, 131, 132, 141, and 142 may have a network functionality or may be connected to another device having a network functionality, and may be directly or indirectly connected to each other through a wire or wirelessly to form a home network 100. Further, the above-described devices may provide operation state information including their on/off states and/or sensor information obtained by sensors equipped in them to the home network 100. Hereinafter, such devices which are directly or indirectly connected to the home network 100 and provide their own operation state information and/or sensor information to the home network 100 are referred to as "home devices."

One or more home devices may be configured to communicate with other home devices in the home network 100 using one or more of fifth generation (5G) cellular network, Bluetooth, Infrared data association (IrDA), Internet of Things (IoT), local area network (LAN), low power network (LPN), low power wide area network (LPWAN), personal area network (PAN), radio frequency identification (RFID), ultra-wide band (UWB), wireless fidelity (Wi-Fi), wireless LAN (WLAN), or ZigBee communication technologies, but are not limited thereto.

One or more home devices may inform the home network 100 of operation state information including their on/off states. For example, the TV 111 may inform the home network of current channel and/or volume information and may also inform the home network of when the channel is changed and/or when a volume is adjusted. The massage chair 115 may inform the home network 100 of its own operating mode, for example, a stretching mode, a recovery mode, or a low noise mode. The refrigerator 125 may inform the home network 100 of when a door is open or closed.

Some home devices, for example, the living room light 116, the kitchen light 126, the water valve 123 of the sink, and the door lock 141 may not have the network functionality. Such home devices may be electrically connected to the home control and automation system 117 and the home control and automation system 117 may control the electrically connected home devices and identify the operation states those of. The living room light 116, the kitchen light 126, the water valve 123, and the door lock 141 may not directly inform the home network 100 of their operation states. Instead, the home control and automation system 117 may inform the home network 100 of a flow rate through the water valve 123, the on/off state of the living room light 116 or the kitchen light 126, or an open/closed state of the front door.

Further, one or more home devices may include one or more sensors which detect the state of the surroundings, for example, an acoustic sensor, an infrared sensor, a temperature sensor, an illumination sensor, or an air pollution sensor. For example, the AI speaker 112 may include an acoustic sensor which detects surrounding sounds, specifically, a voice of the user. The air conditioner 113 may include an infrared sensor which detects a temperature distribution in the surrounding space. The air purifier 114 may include an air pollution sensor which detects a concentration and a spatial distribution of contaminants in the air. One or more home devices may inform the home network 100 of information obtained from one or more sensors. Further, the home control and automation system 117 is connected to one or more energy meters installed in the home area to detect real time power consumption through each electric socket or in each partitioned space.

In the above description, the expression "inform the home network 100" includes informing a smart home server (not shown) connected to the home network 100 and/or informing one or more of home devices connected to the home network 100, using at least one of the above-described communication technologies for the home network 100. Further, one or more home devices may directly inform another home device or indirectly inform another home device via one or more intermediary devices. The intermediary device may be any of the home devices or a separate network device such as a gateway, a hub, a switch, a router, a small cell, a femto cell, a pico cell, or a wireless access point (WAP).

One or more home devices may identify relative positions (for example, directions and/or distances) with respect to other home devices through communication therebetween or their own absolute positions in the home area. For example, the home device may perform direct communication with another home device and estimate a direction and a distance from another home device using a signal strength in accordance with a beamforming direction and a latency of a communication message. The smart home server may collect relative position information from each home device and identify the absolute positions of home devices in the home area. According to another exemplary embodiment, the smart home server may identify the positions of the home devices in the home area by the manual input by the user.

Figure 2:
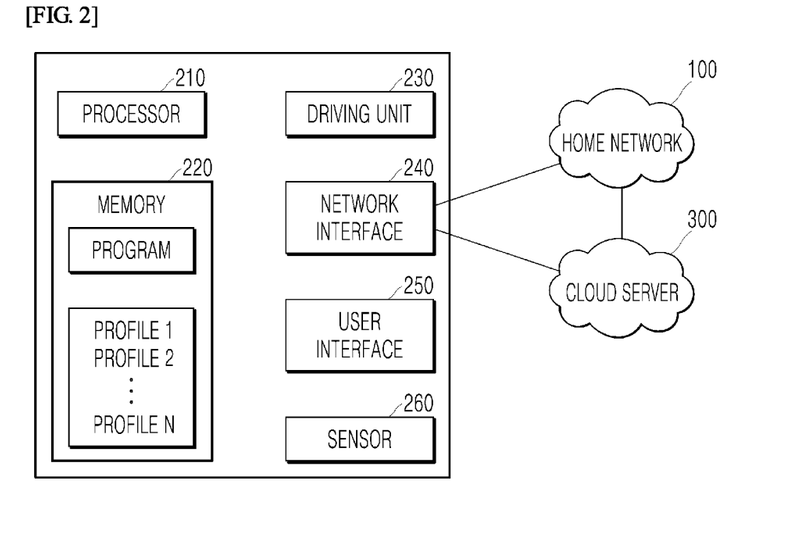
FIG. 2 is a block diagram schematically illustrating a home appliance which generates an operation noise according to an exemplary embodiment of the present disclosure.

FIG. 2 is a block diagram schematically illustrating a home appliance which generates an operation noise according to an exemplary embodiment of the present disclosure.

The home appliance 200 which generates an operation noise may include a processor 210, a memory 220, a driving unit 230, a network interface 240, a user interface 250, and a sensor 260.

The processor 210 may be an arbitrary type of data processing device which is implemented as hardware and has a circuit structured to perform functions expressed by codes or commands included in a program stored in the memory 220. For example, the processor 210 may include one or more of a micro-processor, a central processing unit (CPU), a processor core, a multi-processor, an application-specific integrated circuit (ASIC), and a field-programmable gate array (FPGA), but is not limited thereto.

The memory 220 may be tangible computer-readable media. For example, the memory 220 may include one or more of a magnetic medium such as a hard disk, a floppy disk, or a magnetic tape, an optical recording medium such as a CD-ROM or a DVD, a magneto-optical medium such as a floptical disk, and a solid-state semiconductor device such as a RAM, a ROM, or a flash memory, but is not limited thereto. Further, the memory 220 may include one or more of a volatile memory and a non-volatile memory.

The memory 220 may store a computer program to be executed by the processor 210 and one or more preset operation profiles which operate the driving unit 230. The computer program and one or more preset profiles may be stored respectively in physically separate memory devices or may be stored in logically separate areas in the same physical memory device. Further, the memory 220 may be constituted by a set of a plurality of logically connected physical memory devices, and the program and one or more preset profiles may be stored in logically separate areas in the set of the plurality of logically connected physical memory devices.

The driving unit 230 includes an electric machine to provide power to perform the operations of the home appliance 200. For example, when the home appliance 200 is a washing machine, the driving unit 230 may include a motor which rotates an inner tub or an agitator of the washing machine. When the home appliance is a drying machine, the driving unit 230 may include a motor which rotates an inner tub and a hot-air blower. When the home appliance 200 is a dish washer, the driving unit 230 may include a motor which rotates a spray arm having water spraying nozzles and a water pump. When the home appliance 200 is a closet-type clothing care system, the driving unit 230 may include an actuator which moves a hanger horizontally, vertically and/or diagonally. It should be understood that the driving unit 230 may include an arbitrary type of electric machines which provide power, in addition to the above-described examples. Such an electric machine may generally generate an operation noise when the power is supplied. For example, the motor or the actuator generates the vibration during the operation and the vibration generates vibration-induced noises. The vibration-induced noise may be propagated to a user through an air and/or the floor and/or the wall on which the home appliance 200 is disposed.

The driving unit 230 operates in accordance with the operation profile set by the processor 210. The operation profile defines a power level of the driving unit 230 over time. For example, the operation profile may define a revolution per minute (RPM) of the motor over time. The processor 210 may select one of preset profiles in the memory 220 as an operation profile for the driving unit 230. The processor 210 may modify the preset profile to generate an operation profile for the driving unit 230.

The network interface 240 is configured to communicate with the home network 100. For example, the network interface 240 may communicate with the smart home server (not illustrated) connected to the home network 100 or communicate with other home devices of the home network 100. The network interface 240 may include one or more interfaces for, for example, fifth generation (5G) cellular network, Bluetooth, Infrared data association (IrDA), Internet of Things (IoT), local area network (LAN), low power network (LPN), low power wide area network (LPWAN), personal area network (PAN), radio frequency identification (RFID), ultra-wide band (UWB), wireless fidelity (Wi-Fi), wireless LAN (WLAN), or ZigBee communication technologies, but is not limited thereto.

Further, the network interface 240 may be configured to communicate with an external network, for example, a remote cloud server 300. The network interface 240 may communicate with the external network through a gateway connected to the home network 100 or communicate with an external network through a separate gateway which connects the external network not via the home network 100.

The user interface 250 may include one or more buttons which may be pressed by the user, a touch screen which recognizes the touch of the user, or a dial or a wheel which rotates to allow the user to select one of a plurality of options, but is not limited thereto.

The user interface 250 may allow the user to manually select an operation mode and/or an operation profile of the home appliance 200 and input additional information which may be required to set the operation profile by the processor 210.

The sensor 260 may include a sensor configured to detect an inner state of the home appliance 200 and/or a sensor configured to detect an external surrounding state of the home appliance 200. The sensor 260 may include a weight sensor capable of detecting a weight of a work object inserted in the home appliance 200, a rotary sensor capable of detecting a rotational speed of a rotary element (for example, an inner tub of the washing machine) of the home appliance 200, a displacement sensor capable of detecting a displacement of a displacement element (for example, a hanger) of the home appliance 200, an acoustic sensor capable of detecting sounds around the home appliance 200, and/or an illuminance sensor capable of detecting the illuminance around the home appliance 200. If necessary, the sensor 260 may further include an infrared sensor, a temperature sensor, or the like.

Figure 3:
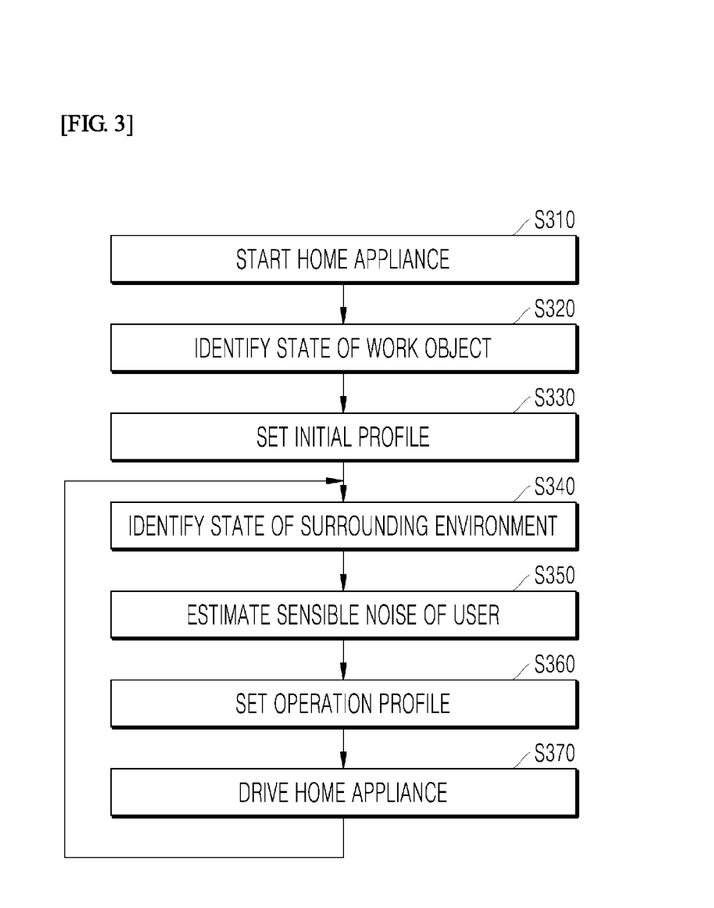
FIG. 3 is a flowchart illustrating an exemplary method of controlling a home appliance according to an exemplary embodiment of the present disclosure.

FIG. 3 is a flowchart illustrating an exemplary method of controlling a home appliance according to an exemplary embodiment of the present disclosure. The method of controlling a home appliance according to an exemplary embodiment of the present disclosure will be described below in detail with reference to FIG. 3.

Starting of Home Appliance

In step S310, the home appliance 200 is started. The user inserts a work object (for example, laundry) in the home appliance 200 and presses a power button in the user interface 250 to start the home appliance 200. Additionally, the user may select a desired operation mode (for example, a white clothing mode or a spin-dry mode) through the user interface 250.

Identification of State of Work Object

In step S320, the processor 210 identifies a state of the work object. The processor 210 may identify an amount, a weight, a volume, and/or a type of the work object using information obtained from the sensor 260 (for example, a weight sensor).

Setting of Initial Profile

In step S330, the processor 210 may set an initial profile to operate the driving unit 230, based on the state of the work object identified in step S320 and additionally based on the operation mode selected by the user in step S310. For example, the processor 210 selects a preset profile which best matches the identified amount, weight, volume, or type of the work object and the operation mode selected by the user, among the plurality of preset profiles stored in the memory 220 and sets the selected profile as an initial profile for operating the driving unit 230. Further, the processor 210 may instruct the driving unit 230 to operate in accordance with the set initial profile. According to embodiments, the step S330 of setting an initial profile may be omitted or combined with step S360 of setting an operation profile which will be described below.

Identification of State of Surrounding Environment

Figure 4:
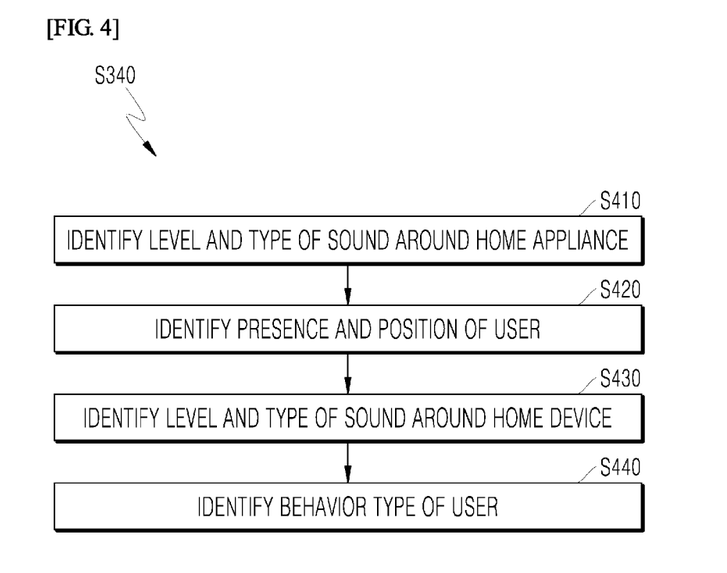
FIG. 4 is a flowchart illustrating an exemplary method of identifying a state of a surrounding environment according to an exemplary embodiment of the present disclosure.

In step S340, the processor 210 identifies a state of the surrounding environment based on information obtained from the sensor 260, operation state information and/or sensor information obtained from one or more home devices. The state of the surrounding environment may include at least one of a level of a sound around the home appliance 200, a type of sound around the home appliance 200, a state (for example, a position of the user or a behavior type of the user) of the user, a level of a sound around the home device, or a type of sound around the home device. FIG. 4 is a flowchart illustrating an exemplary method of identifying a state of a surrounding environment according to an exemplary embodiment of the present disclosure. The method of identifying a state of a surrounding environment according to an exemplary embodiment of the present disclosure will be described below in detail with reference to FIG. 4.

Identification of Level and Type of Sound Around Home Appliance

In step S410, the processor 210 may identify a level and a type of a surrounding sound of the home appliance 200 using information obtained from the sensor 260. For example, the processor 210 may identify a level of the sound around the home appliance 200 from a level of the signal in sensor data obtained from the acoustic sensor. Further, the processor 210 may separate sensor data obtained from the acoustic sensor in accordance with frequency bands and identify a type (for example, a voice, a music, or a noise) of the sound around the home appliance 200 based on signal distribution in the frequency bands. The sound around the home appliance 200 may include two or more types of sounds. The processor 210 may identify each sound type included in the surrounding sound and identify the level of the sound for each sound type. The processor 210 may separate the sound data into an operation noise of the home appliance 200 caused by the operation of the driving unit 230 and a surrounding sound other than the operation noise, and identify a level of the operation sound as well as a type and a level of the surrounding sound.

The processor 210 may identify the type of sound using artificial intelligence. For example, the processor 210 may provide sensor data obtained from the acoustic sensor as an input to an artificial neural network (ANN) which has been trained in advance to identify a type and/or a cause of the sound through a deep learning technique and identify the type of the obtained sound based on an output from the artificial neural network.

An ANN is a data processing system modelled after the mechanism of biological neurons and interneuron connections, in which a number of neurons, referred to as nodes or processing elements, are interconnected in layers. ANNs are models used in machine learning and may include statistical learning algorithms conceived from biological neural networks (particularly of the brain in the central nervous system of an animal) in machine learning and cognitive science. ANNs may refer generally to models that have artificial neurons (nodes) forming a network through synaptic interconnections, and acquire problem-solving capability as the strengths of synaptic interconnections are adjusted throughout training. An ANN may include a number of layers, each including a number of neurons. Furthermore, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a previous layer.

An ANN may include a deep neural network (DNN). Specific examples of the DNN include a convolutional neural network (CNN), a recurrent neural network (RNN), a deep belief network (DBN), and the like, but are not limited thereto.

An ANN may be classified as a single-layer neural network or a multi-layer neural network, based on the number of layers therein.

In general, a single-layer neural network may include an input layer and an output layer.

In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be the most representative type of artificial neural network which enables deep learning, which is one machine learning technique.

An ANN can be trained using training data. Here, the training may refer to the process of determining parameters of the artificial neural network by using the training data, to perform tasks such as classification, regression analysis, and clustering of inputted data. Such parameters of the artificial neural network may representatively include synaptic weights and biases applied to neurons.

An artificial neural network trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

A GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is a machine learning method that makes use of both labeled training data and unlabeled training data.

Semi-supervised learning is one of the techniques which is to deduce labels of unlabeled training data and then perform leaning using the deduced labels. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process.

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

Also, the hyperparameters are set before learning, and model parameters can be set through learning to specify the architecture of the artificial neural network by the configuration of the model, the activation function, the loss function or the cost function, the learning algorithm, the optimization algorithm, or the like.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a loss function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the value of a loss function by using a current slope of the loss function.

The direction in which the model parameters are to be adjusted may be referred to as a step direction, and a size by which the model parameters are to be adjusted may be referred to as a step size.

Here, the step size may mean a learning rate.

GD may obtain a slope of the loss function through use of partial differential equations, using each of model parameters, and update the model parameters by adjusting the model parameters by a learning rate in the direction of the obtained slope.

SGD may include a method that separates the training data into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy by adjusting the momentum in SGD and step direction in NAG. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely on the structure and the kinds of learning optimization algorithms of the artificial neural network as well as on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

Meanwhile, the artificial neural network can be trained by adjusting connection weights between nodes (if necessary, adjusting bias values as well) so as to produce desired output from given input. Also, the artificial neural network can continuously update the weight values through learning. Furthermore, methods such as back propagation may be used in training the artificial neural network.

The artificial neural network may be implemented as a hardware module and/or a software module to be included in the home appliance 200. According to another exemplary embodiment, the artificial neural network may be implemented in a remote cloud server 300. The processor 210 provides sensor data obtained from the acoustic sensor to the remote cloud server 300 through the network interface 240 and identifies the type and the level of the sound obtained based on the output from the cloud server 300. The artificial neural network may be trained to identify the type of sound in detail. For example, the artificial neural network may classify the sound data into conversation, phone calls, snoring, a TV sound, a music, a cleaner noise, a dishwashing noise, or an external noise. Further, the artificial neural network may identify that two or more types of sounds are included in the sensor data and identify a type and a level of each sound.

Identification of Presence and Position of User

In step S420, the processor 210 may identify presence of the user in the home area and the position of the user based on operation state information and/or sensor information obtained from one or more home devices. Hereinafter, the expression "identify a position of a user" is used as a meaning including identifying the presence of the user in the home area and "a position of a user" is used as a meaning including non-presence of a user in the home area.

A lighting state of the living room light 116 or the kitchen light 126 may imply that the user is in the living room 110 or the kitchen 120. Similarly, the detection of the smoke by the smoke detector 122 of the hood or the detection of water flow by the water valve 123 may imply that the user is located in the vicinity of the hood or in the vicinity of the sink.

From the operation state information of the TV 111 indicating that the channel of the TV 111 is changed or the volume is adjusted, it may be deduced that the user is located in the vicinity of the TV 111. From the detection of a voice of the user by the AI speaker 112, it may be deduced that the user is located in the vicinity of the AI speaker 112.

The more specific position of the user in the space may be deduced from temperature distribution of the surrounding space detected by the air conditioner 113 and/or distribution of contaminants detected by the air purifier 114. Operation information indicating that the massage chair 115 operates enables a more powerful reasoning that the user is lying on the massage chair 115. The sensor information obtained from the human body sensing sensor 118 may more reliably prove the presence of the user.

The operation state information of the door lock 141 of the front door and the sensor information of the entrance sensor 142 may identify that the user enters or leaves the surrounding environment (for example, home).

The processor 210 may know the position of one or more home devices. For example, the processor 210 may have obtained the position information of the home devices from the smart home server in advance. The processor 210 may identify the position information of the home devices as well as the position of the user from the combination of two or more of the above-described operation state information and sensor information of the home devices. The more the amount of the combined operation state information and/or the sensor information, the higher the reliability of the identified position of the user. In order to increase the reliability, the processor 210 may request the operation state information and/or the sensor information from one or more home devices and additionally combine the operation state information and/or sensor information obtained in response to the request.

Identification of Level and Type of Sound Around Home Device

In step S430, the processor 210 may identify a level and/or a type of a surrounding sound of home devices based on the operation state information and/or sensor information received from the home devices.

One or more home devices may have a speech recognition function and an acoustic sensor therefor. Each home device may detect the surrounding sound using the acoustic sensor and identify the level of the surrounding sound. Further, one or more home devices may identify the type of the surrounding sound. For example, the home device may divide the detected sound in accordance with a frequency band and classify the sound into a voice, a music, or a noise based on a signal distribution in each frequency band. Some home devices (for example, TV 111) may determine a level of the surrounding sound and a type of the sound from their own operation states (for example, a volume) without detecting the sound.

The processor 210 may obtain information on the sound around the home device from one or more home devices. The processor 210 may obtain information on the level and the type of the sound around each home device from one or more home devices. According to another exemplary embodiment, the processor 210 may obtain sound data from one or more home devices and identify the level and the type of the sound around the home device based on the sound data from each home device. As described above in the description of the identification of a level and a type of the sound around the home appliance, the processor 210 may identify the level and the type of the sound using artificial intelligence.

Identification of Behavior Type of User

In step S440, the processor 210 may identify a behavior type of a user, based on the operation state information and/or sensor information received from the home devices. The behavior type of the user may include, for example, conversation, phone calls, watching TV, listening to music, sleeping, cleaning, and dishwashing, but is not limited thereto. When there are two users in the home area, behavior types of the individual users may be identified.

The behavior type of the user may be identified additionally based on the identified position of the user and/or the type of the sound around the home device. Further, the processor 210 may identify the behavior type of the user using artificial intelligence.

For example, when it is identified that the user is in the living room 110, the TV 111 is not operating, and a type of the sound detected from one or more home devices disposed in the living room 110 is a voice of one person, the behavior type of the user may be identified as talking on the phone. As another example, when it is identified that the user is located in a bathroom (not illustrated), the bathroom light is turned on, and a water flow through a water valve of a shower booth is detected, the behavior type of the user may be identified as taking a shower. As another example, when it is identified that the user is located in a bedroom (not illustrated), the bedroom light is turned off, and snoring of the user is detected, the behavior type of the user may be identified as sleeping. The more the amount of combined information, the higher the reliability of identification of the behavior type of the user. In order to increase the reliability, the processor 210 may request one or more home devices operation state information and/or sensor information and additionally combine the operation state information and/or the sensor information obtained in response to the request.

The step S410 of identifying a level and a type of sound around the home appliance, the step S420 of identifying the position of the user, the step S430 of identifying a level and a type of sound around the home device, and the step S440 of identifying a behavior type of the user which have been described above are not necessarily performed in the above described order. According to the embodiments, the steps may be simultaneously performed, or performed in a different order, or some steps may be omitted.

Estimation of Sensible Noise

Referring back to FIG. 3, in step S350, the processor 210 estimates a level of a sensible noise of the user. In this description, the "sensible noise" of the user may refer to a noise which is generated by the operation of the driving unit 230 and is sensed by the user. In other words, a level of the sensible noise refers to a level of the operation noise of the driving unit 230 which is sensed by the user.

According to an exemplary embodiment, the processor 210 may estimate the sensible noise of the user based on the level of the operation noise identified in step S410 and the position of the user identified in step S420. The level of the sensible noise which is sensed by the user is inversely proportional to a distance between the home appliance 200 and the user. The processor 210 may estimate the distance between the home appliance 200 and the user based on the position of the user and estimate the level of the sensible noise sensed by the user, based on the estimated distance and the level of the operation noise in the vicinity of the home appliance 200. In the meantime, when the user is not present in the home area, the sensible noise of the user is estimated as zero (0).

According to another exemplary embodiment, the level of the operation noise in the vicinity of the home appliance 200 may be estimated by the operation profile by which the driving unit 230 is operating. For example, levels of operation noises of a plurality of preset profiles may be stored in the memory 220 and the processor 210 may find a level of the operation noise for the profile which currently operates the driving unit 230 from the memory to estimate the level of the operation noise in the vicinity of the home appliance 200. Accordingly, the processor 210 may estimate the level of the sensible noise sensed by the user, based on the level of the operation noise estimated by the operation profile, without using the acoustic sensor 260.

According to another exemplary embodiment, the processor 210 may estimate the level of the sensible noise sensed by the user based on sound data from an acoustic sensor equipped in the home device. For example, the processor 210 compares the sound data obtained from a home device which is adjacent to the position of the user with the operation profile which is on operation to extract components related to the operation noise from the sound data and estimate the level of the operation noise sensed by the home device therefrom. The level of the operation noise sensed by the home device in the vicinity of the user may be estimated as a level of the sensible noise sensed by the user. Further, the processor 210 may perform machine learning on the level of the sensible noise which is estimated in accordance with the position of the user and the operation profile. The machine learning allows the processor 210 to estimate the level of the sensible noise of the user only by the position of the user and the operation profile, without using the sound data from the home device.

Setting of Operation Profile

In step S360, the processor 210 sets an operation profile for operating the driving unit 230, based on at least one of a type or a level of a sound around the home appliance, a type or a level of a sound around the user, a level of a sensible noise of the user, or a behavior type of the user. The processor 210 may select any one profile from a plurality of preset profiles stored in the memory 220 as a new operation profile. As another example, the processor 210 may modify the operation profile which is on operation to increase an average power level over time of the driving unit and reduce the operation time, or on the contrary, may modify the operation profile which is on operation to reduce the average power level over time and increase the operation time.

In the operation profile, the average power level over time trades off the operation time required to achieve a desired goal of the home appliance 200. In other words, the higher the average power level, the shorter the required operation time, and the lower the average power level, the longer the required operation time. Generally, the average power level of the driving unit 230 may be proportional to the operation noise of the driving unit 230. That is, an operation profile which drives the driving unit 230 with a reduced power level may have a reduced noise level and an operation profile which drives the driving unit 230 with an increased power level may have an increased noise level.

Setting of Operation Profile Based on Type of Surrounding Sound

Figure 5:
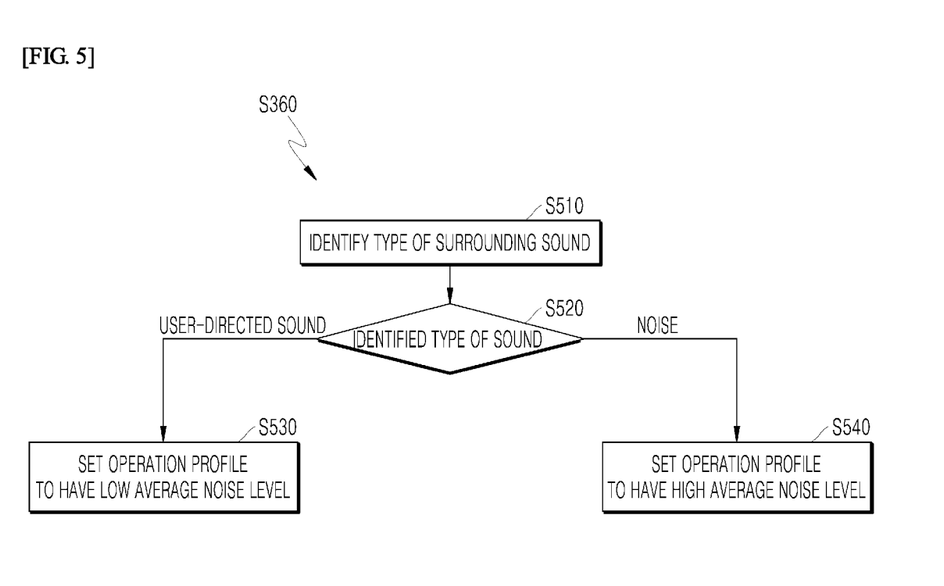
FIG. 5 is a flowchart illustrating an exemplary method of changing an operation profile based on a type of a surrounding sound according to an exemplary embodiment of the present disclosure.

FIG. 5 is a flowchart illustrating an exemplary method of changing an operation profile based on a type of a surrounding sound according to an exemplary embodiment of the present disclosure. In step S510, the processor 210 identifies a type of sound around the home appliance 200 or a type of sound around the user. The type of the sound around the user may be identified from sound data obtained from the home device which is adjacent to the position of the user identified in step S420. In this case, the sound around the user may refer to sounds excluding the operation noise caused by the operation of the home appliance 200.

In step S520, the processor 210 determines whether the identified type of the sound around the home appliance 200 or the identified type of the sound around the user corresponds to a category of a user-directed sound which requires the concentration of the user or a category of a noise which does not require the concentration of the user. The category of the user-directed sound may include conversation, talking on the phone, TV sound, and music and the category of the noise may include a cleaner noise, a dishwashing noise, and an external noise, but is not limited thereto.

When the identified type of the sound corresponds to the category of the user-directed sound, in step S530, the processor 210 may set a preset profile having an average power which is equal to or lower than a threshold power level as the operation profile or modify an operation profile to reduce the average noise level as compared with the operation profile which is on operation. Accordingly, by reducing the average noise level of the operation profile, interruption of the operation noise to a sound which requires the concentration of the user and the discomfort of the user thereby can be reduced.

In contrast, in step S540, when the type of the sound around the home appliance 200 or a type of the sound around the user corresponds to the category of the noise, the processor 210 may set a preset profile having an average power which is equal to or higher than the threshold power level as an operation profile or modify the operation profile to increase the average noise level as compared with the operation profile which is on operation. Accordingly, by increasing the average noise level of the operation profile, an operation time to achieve a desired goal of the home appliance 200 can be reduced without substantially increasing the discomfort of the user caused by the operation noise. For example, in a spin-drying mode of the washing machine, the average noise level of the operation profile is increased so that a spin-drying time required for the spin-drying operation may be reduced.

Setting of Operation Profile Based on Behavior Type of User

Figure 6:
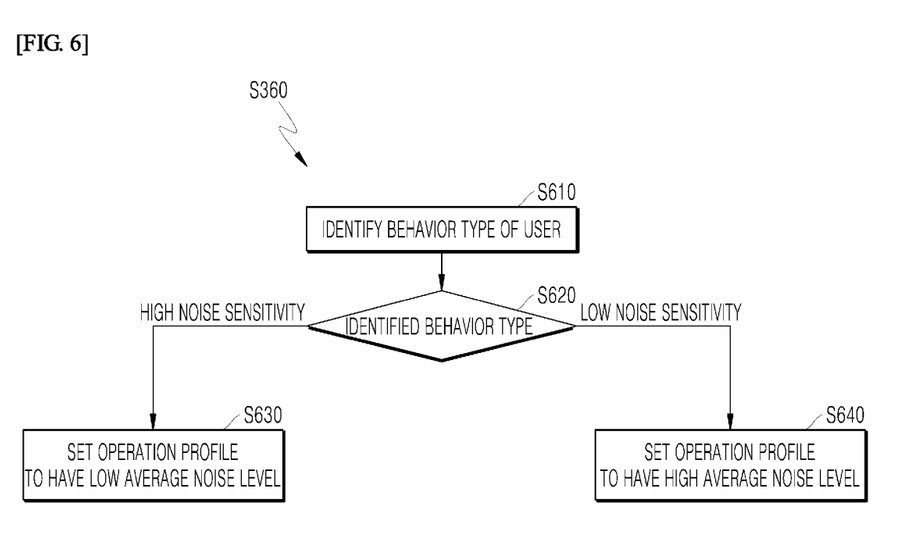
FIG. 6 is a flowchart illustrating an exemplary method of changing an operation profile based on a user's behavior type according to an exemplary embodiment of the present disclosure.

FIG. 6 is a flowchart illustrating an exemplary method of changing an operation profile based on a user's behavior type according to an exemplary embodiment of the present disclosure. In step S610, the processor 210 identifies the behavior type of the user. The step S610 may be the same step as the step S440 of identifying the behavior type of the user.

In step S620, the processor 210 determines whether the identified behavior type of the user corresponds to a category of a behavior having high noise sensitivity or corresponds to a category of a behavior having low noise sensitivity. The category of the behavior having high noise sensitivity may include conversation, talking on the phone, reading, and sleeping and the category of the behavior having low noise sensitivity may include cleaning, dishwashing, and taking a shower, but is not limited thereto.

When the identified behavior type of the user corresponds to the category of the behavior having high noise sensitivity, in step S630, the processor 210 may set a preset profile having an average power which is equal to or lower than a threshold power level as an operation profile or modify the operation profile to reduce the average noise level as compared with the operation profile which is on operation. Accordingly, by reducing the average noise level of the operation profile, interruption of the operation noise to a behavior which requires the concentration of the user and the discomfort of the user thereby can be reduced.

On the contrary, in step S640, when the behavior type of the user corresponds to the category of the behavior having low noise sensitivity, the processor 210 may set a preset profile having an average power which is equal to or higher than a threshold power level as an operation profile or modify the operation profile to increase the average noise level as compared with the operation profile which is on operation. Accordingly, by increasing the average noise level of the operation profile, an operation time to achieve a desired goal of the home appliance 200 can be reduced without substantially increasing the discomfort of the user caused by the operation noise.

Setting of Operation Profile in Accordance with Level of Sensible Noise of User

Figure 7:
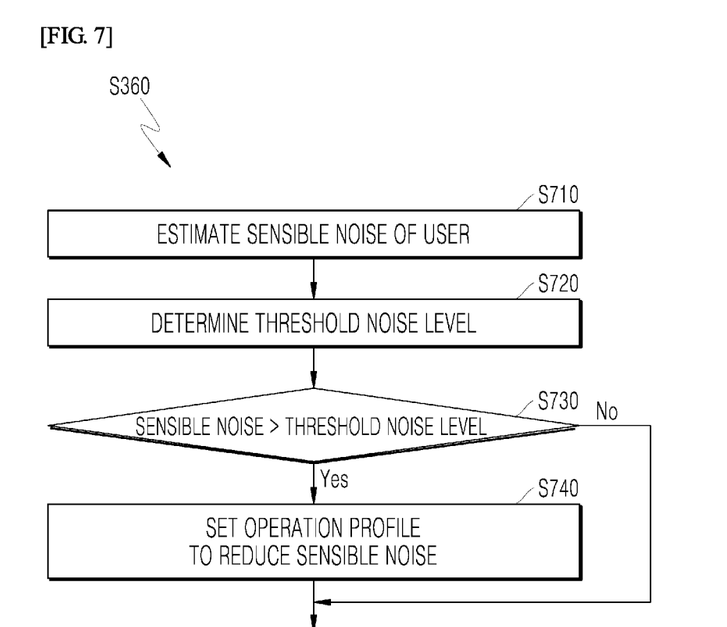
FIG. 7 is a flowchart illustrating an exemplary method of changing an operation profile based on a user's sensible noise according to an exemplary embodiment of the present disclosure.

FIG. 7 is a flowchart illustrating an exemplary method of changing an operation profile based on a user's sensible noise according to an exemplary embodiment of the present disclosure.

In step S710, the processor 210 estimates a level of the sensible noise sensed by the user. The step S710 may be the same step as the step S350 of estimating a sensible noise of the user.

In step S720, the processor 210 may determine a threshold noise level which is a tolerance limit of the sensible noise of the user caused by the operation noise of the home appliance 200. The threshold noise level may be determined based on the type of the sound around the user and the type of the sound around the user may be estimated from the type of the sound around the home device in the vicinity of the user. When the type of the sound around the user belongs to a category of a user-directed sound which requires the concentration of the user, the processor 210 may set a threshold noise level as a first noise level. When the type of the sound around the user belongs to a category of a noise which does not require the concentration of the user, the processor 210 may set a threshold noise level as a second noise level which is higher than a first noise level.

In this case, the first noise level and the second noise level may be set based on the level of the sound around the user, respectively. According to an exemplary embodiment, the first noise level and the second noise level may be set by a first fraction and a second fraction of the level of the sound around the user. For example, when the user is watching TV, the user may be sensitive to a noise of −20 dB or higher for the level of the TV sound and the processor 210 may set one-tenth (or −20 dB) of the level of the sound around the user as the first noise level. When the user is operating the cleaner, the user may be sensitive to a noise of −6 dB or higher for the level of the cleaner noise and the processor 210 may set a half (or −6 dB) of the level of the sound around the user as the second noise level. According to another exemplary embodiment, the second noise level may be set based on a user's tolerable noise level. For example, the user may tolerate a sound of 70 dB or lower and the second sound level may be set such that a sum noise level of the sensible noise of the user caused by the operation noise of the home appliance 200 and the sound around the user is equal to or lower than the tolerable noise level.

The threshold noise level is also determined based on the behavior type of the user. When the behavior type of the user belongs to a category of a behavior type having high noise sensitivity, the processor 210 may set the threshold noise level as a third noise level. When the behavior type of the user belongs to a category of a behavior type having low noise sensitivity, the processor 210 may set the threshold noise level as a fourth noise level which is higher than the third noise level. Similar to the first noise level and the second noise level, the third noise level and the fourth noise level may be, respectively, set based on the level of the sound around the user.

The threshold noise level may also be determined in consideration of a time of a day. For example, the processor 210 may set a threshold noise level as a fifth noise level after 9 pm and before 7 am and set a threshold noise level as a sixth noise level which is higher than the fifth noise level after 7 am and before 9 pm.

The threshold noise level may be determined in consideration of two or more of the above-described threshold noise level determining factors (the type of the sound around the user, the level of the sound around the user, the behavior type of the user, and the time in a day).

In step S730, the processor 210 compares the estimated sensible noise of the user with the threshold noise level. In step S740, when the estimated sensible noise of the user exceeds the threshold noise level, the processor 210 may set the operation profile such that the sensible noise is equal to or lower than the threshold noise level. For example, the processor 210 may select an operation profile which causes the sensible noise of the user which is equal to or lower than the threshold noise level from a plurality of preset operation profiles stored in the memory 220 or modify the operation profile to reduce the average noise level as compared with the operation profile which is on operation.

Accordingly, by setting the operation profile of the home appliance 200 based on the sensible noise of the user, the sensible noise of the user caused by the operation noise can be maintained to be equal to or lower than the threshold noise level and the discomfort of the user due to the operation noise can be reduced.

In the meantime, the threshold noise level may be machine-learned from the operation profile which is manually selected by the user. For example, after setting the operation profile, the user may manually modify the operation profile using the user interface 250. The processor 210 may collect the operation profiles selected by the user in association with the state of the work object at that time, the type of the sound around the user, the level of the sound around the user, the behavior type of the user and/or the time of a day and machine-learn the threshold noise level preferred by the user from the collected data.

Driving of Home Appliance in Accordance with Operation Profile

In step S370, the processor 210 instructs the driving unit 230 to operate in accordance with the modified operation profile. Thereafter, the processor 210 repeats the steps S340 to S370. By doing this, even though the state of the surrounding environment is changed after setting the operation profile, the discomfort of the user caused by the operation noise can be reduced or the operation time of the home appliance 200 can be reduced without substantially increasing the discomfort of the user.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher-level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A method for controlling a home appliance, the method performed by one or more processors of the home appliance and comprising:
   operating the home appliance using a first operation profile;
   identifying a type of sound around a user; and
   changing an operation profile for operating the home appliance to a second operation profile, based on the type of sound around the user,
wherein the type of sound around the user is identified using sound data obtained from one or more devices in a home network connected to the home appliance or sensor information from the one or more devices and from a deep neural network that has been trained in advance to estimate a type of sound in accordance with collected sound data.

2. The method according to claim 1, wherein the identifying type of sound around the user comprises identifying based on at least one of operation state information of the one or more devices in the home network connected to the home appliance or the sensor information from the one or more devices.

3. The method according to claim 1, wherein the second operation profile has a reduced operation time and an increased average noise level as compared with the first operation profile, or the second operation profile has an increased operation time and a reduced average noise level as compared with the first operation profile.

4. The method according to claim 1, further comprising identifying a position of the user,
   wherein the changing the operation profile to the second profile comprises:
      determining a sensible noise of the user caused by the second operation profile based on the position of the user; and
      determining the second operation profile that causes the sensible noise of the user that is equal to or lower than a threshold noise level.

* * * * *